United States Patent [19]

Edwards et al.

[11] Patent Number: 5,471,114
[45] Date of Patent: Nov. 28, 1995

[54] FAIL-SAFE UNINTERRUPTIBLE LIGHTING SYSTEM

[75] Inventors: M. Larry Edwards, Woodward; W. Joe Watson, Edmond, both of Okla.

[73] Assignee: DMI Holdings, Inc., Woodward, Okla.

[21] Appl. No.: 260,487

[22] Filed: Jun. 15, 1994

Related U.S. Application Data

[63] Continuation of Ser. No. 63,359, May 17, 1993, abandoned, which is a continuation of Ser. No. 792,025, Nov. 13, 1991, abandoned, which is a continuation-in-part of Ser. No. 629,256, Dec. 18, 1990, abandoned.

[51] Int. Cl.$^6$ .................................................. H05B 37/00
[52] U.S. Cl. ........................... 315/86; 307/46; 307/66; 315/176
[58] Field of Search .......................... 315/86, 119, 160, 315/161, 175, 176, 219, DIG. 7, 208; 307/46, 48, 66; 320/14, 13

[56] References Cited

U.S. PATENT DOCUMENTS

| | | | |
|---|---|---|---|
| 3,257,603 | 6/1966 | Laube | 307/66 |
| 3,319,074 | 4/1967 | Koch | 307/66 |
| 3,440,435 | 4/1969 | Sanders | 307/66 |
| 3,480,791 | 11/1969 | Lesher | 307/66 |
| 3,691,450 | 9/1972 | Cox | 315/219 |
| 3,743,918 | 7/1973 | Maitre | 315/219 |
| 3,801,794 | 4/1974 | Mauch et al. | 307/66 |
| 3,836,815 | 9/1974 | Herzog | 315/86 |
| 4,075,504 | 2/1978 | Gnaedinger | 307/66 |
| 4,751,398 | 6/1988 | Ertz, III | 307/66 |
| 4,763,826 | 6/1988 | Masson | 307/66 |
| 4,890,004 | 12/1989 | Beckerman | 315/86 |

OTHER PUBLICATIONS

Webster's New World Dictionary, 2nd College Edition Copyright 1974 p. 308.

*Primary Examiner*—Robert J. Pascal
*Assistant Examiner*—Michael Shingleton
*Attorney, Agent, or Firm*—Harold Levine

[57] ABSTRACT

A fail safe power supply system specially adapted for supplying power to devices such as lights. A battery is provided to supply power to the devices, and during normal operation, charge on the battery is maintained within selected levels by a charging control system that is connected to a source of commercial power. During a commercial power outage, the battery continues to supply normal power to the devices for a prolonged period of time, usually until commercial power is restored, thus obviating the necessity for a separate backup power source.

5 Claims, 9 Drawing Sheets

FAIL-SAFE UNINTERRUPTIBLE LIGHTING SYSTEM

This application is a continuation of application Ser. No. 08/063,359 filed May 17, 1993 now abandoned, which is a continuation application of Ser. No. 07/792,025 filed Nov. 13, 1991 now abandoned, which is a continuation-in-part application of Ser. No. 07/629,256 filed Dec. 18, 1990 now abandoned.

The invention relates to lighting systems and more particularly to such systems that provide uninterrupted operation during loss of normal commercial power.

BACKGROUND OF THE INVENTION

It is well known that there are many lighting systems whose dependability and continuity of operation is essential. Thus, for example, lighting in hospital operating rooms and other critical areas such as emergency exits must be maintained during power outages that sometimes unavoidably occur. In addition, there is a vital need for the maintenance of lighting in other important but somewhat less critical areas such as manufacturing facilities where loss of lighting results in shut-down, thus requiring evacuation of personnel, and entailing unacceptable financial/economic detriment.

Because of the necessity to ensure continuity of at least a minimum threshold level of lighting in critical areas, and because of the economic importance of maintaining normal levels of lighting in other areas, a variety of proposals have heretofore been made. These have included the provision of separate stand-alone emergency lighting units critically positioned so as to provide sufficient light to permit orderly evacuation, separate motor-generator sets adapted for start-up to provide power during emergencies, wholly or partly redundant lighting units, and/or battery powered emergency sources adapted for switching during emergencies so as to provide temporary sources of power during brief outages. However, the provision and maintenance of equipment necessary for the practice of these proposals has in some instances been excessively costly, in others bulky or cumbersome, in others essentially duplicative, or in others insufficiently reliable or dependable. Accordingly, there has continued to be a need for an improved and relatively inexpensive lighting system that provides a fully dependable and continuous supply of normal lighting.

BRIEF SUMMARY OF THE INVENTION

The improvements according to the invention, include the provision of a system in which but one or one set of lighting elements can be utilized. These elements are energized from a bank of batteries that supply power during both normal and emergency conditions. When normal commercial power is available, it is utilized to maintain the batteries in a charged condition. If and when there is a power outage, the batteries continue to supply power to the lights during the outage to provide essentially the same lighting levels as while commercial power was received. There is no need for switching the lighting fixtures from one power source to another, with the attendant danger of failure or interruption that such switching incurs. After the outage is over and normal commercial power is resumed, the battery charging circuits return the batteries to their fully charged condition.

According to additional proposals, in one embodiment electronic circuits are included to provide main and topping power supply for maintaining the batteries in a predetermined charged profile, thus enhancing their operating characteristics and adding to their life. In another and preferred embodiment, the electronic circuits are simplified by eliminating the "topping" feature, and the main supply is employed to maintain the batteries in their predetermined charged profile. Provision can be made so that the system operation can be selected to provide conventional emergency backup for a conventional primary lighting source.

OBJECTS AND FEATURES OF THE INVENTION

It is one general object of the invention to improve lighting systems.

It is another object of this invention to increase the dependability of lighting systems.

It is yet another object of this invention to render lighting systems essentially fail-safe.

It is still another object of the invention to reduce costs of fully dependable, essentially fail-safe lighting systems.

It is yet another object of the invention to increase overall cost effectiveness of dependable lighting systems.

It is still another object of the invention to provide an improved electronic processor for monitoring and controlling the system.

It is yet one additional object of the invention to provide an improved electronic ballast control of fluorescent lamps when used in a system according to the invention.

Accordingly, in accordance with one feature of the invention, only one lamp or a single set of lamps are utilized for providing both primary and back-up (fail-safe) light, thereby simplifying the lighting installation and minimizing the amount of space required.

In accordance with yet another feature of the invention, essentially the same light output is provided by the system irrespective of whether it is operating in the principal or back-up mode.

In accordance with still another feature of the invention, an improved electronic control system is provided, thereby providing for fast recharge of primary batteries after emergency use.

In accordance with still another feature of the invention, the improved electronic control system is effective to monitor the condition of the batteries and to maintain their charge at predetermined levels, thus facilitating system operation and prolonging battery life.

In accordance with still a further feature of the invention, the improved electronic supervisory control system is conditionable to establish and maintain a continuous level of lighting, thus increasing relative independence from external influences.

These and other objects and features of the invention will become apparent from the following detailed description, by way of a preferred example, with reference to the drawings.

DESCRIPTION OF A PREFERRED EMBODIMENT

Figure 1:
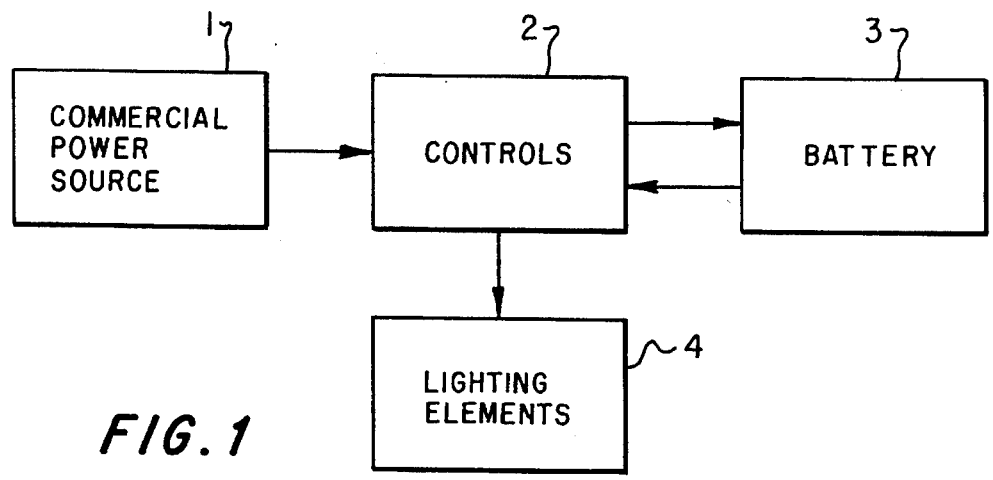
FIG. 1 is a high level block diagram illustrating the principles of the invention.

Now turning to the drawing, and more particularly FIG. 1 thereof, it will be observed that it depicts the principal components of a first system in accordance with principles of the invention. Depicted there are commercial alternating current (AC) power source 1, controls 2, battery 3 and lighting elements 4. More specifically, the system according to the invention employs controls 2 to: (1) regulate the charging of the battery 3; and (2) control flow of direct current (DC) from the battery and/or from one or more other direct current sources (e.g., rectified commercial power) to the lighting elements 4, according to a selected mode of operation as hereinafter set forth in greater detail.

Figure 2:
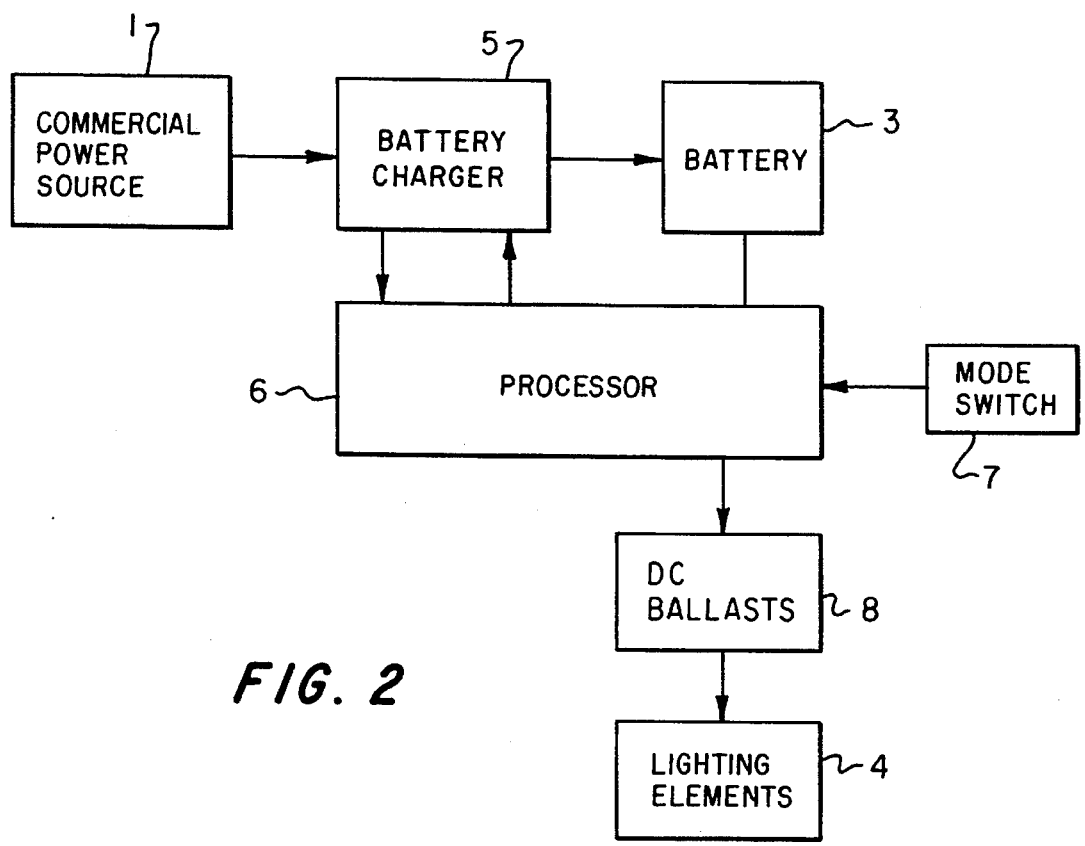
FIG. 2 is a system block diagram illustrating how the operating principles of FIG. 1 are effected through the use of various system components.

As mentioned above, FIG. 2 depicts the components of FIG. 1 and, in addition, several system sub-components in greater detail. Thus, FIG. 2 illustrates how the principles of the invention are effected through the use of various system components. The controls 2 of FIG. 1 are embodied in the following components of FIG. 2: the battery charger 5, the processor 6, the mode switch 7, and the DC ballast 8.

As will be evident to one skilled in the art, the battery charger 5 regulates the charging current of the battery 3 in response to control inputs from the processor 6 as required to maintain the desired voltage level on the battery 3. The mode switch 7 (which may be any suitable conventional electrical selector switch) allows the system to operate in any of the following modes:

Mode A: operation when lighting elements 4 are OFF (unilluminated)

Mode B: operation when lighting elements 4 are ON (illuminated) and when primary (commercial) power is either being supplied or not being supplied Mode C: operation when lighting elements 4 are in STANDBY (or AUTOMATIC) mode, operating as emergency lights which turn ON automatically upon loss of AC power and turn OFF automatically when AC power is resumed, along with the automatic recharging of the battery.

The processor 6 also monitors the commercial power source 1 via the battery charger 5 in order to effect Mode C. All three modes (i.e., modes A, B and C) are controlled by the processor 6 as it supplies or does not supply power to the load, e.g., DC ballast 8.

While the principles of the invention are embodied in a fail-safe lighting system in which lights are the intended load, it will be evident that the principles hereof are also applicable to systems that provide power for other types of loads such as, for example, computers, communication systems and the like for which the provision of uninterrupted power is important. Therefore, while in the following detailed descriptions the preferred embodiments contemplate use in fail-safe lighting systems, it will be evident that they are intended to include other applications such as those hereinbefore identified.

Each DC ballast 8 is an electronic DC power inverter, which changes the DC power to a suitable AC voltage and frequency for illuminating the fluorescent lighting elements 4. It has a self-excited oscillator that depends on its own resonant circuits for the initiation of oscillation and for frequency determination. Any of a variety of commercially available DC power inverters may be employed in practicing the principles of the invention, for example, a "driven" rather than self excited circuit is deemed preferable for the second embodiment of the invention which is described below. In any event, however, high efficiency electronic inverters are particularly attractive for their reduced power use and the attendant reduction in power consumption. Although for clarity and conciseness of description, ballast 8 is shown as a single unit, it will be obvious to those skilled in the art that the invention hereof contemplates installations having a plurality of such ballasts and connected light elements.

Figure 3:
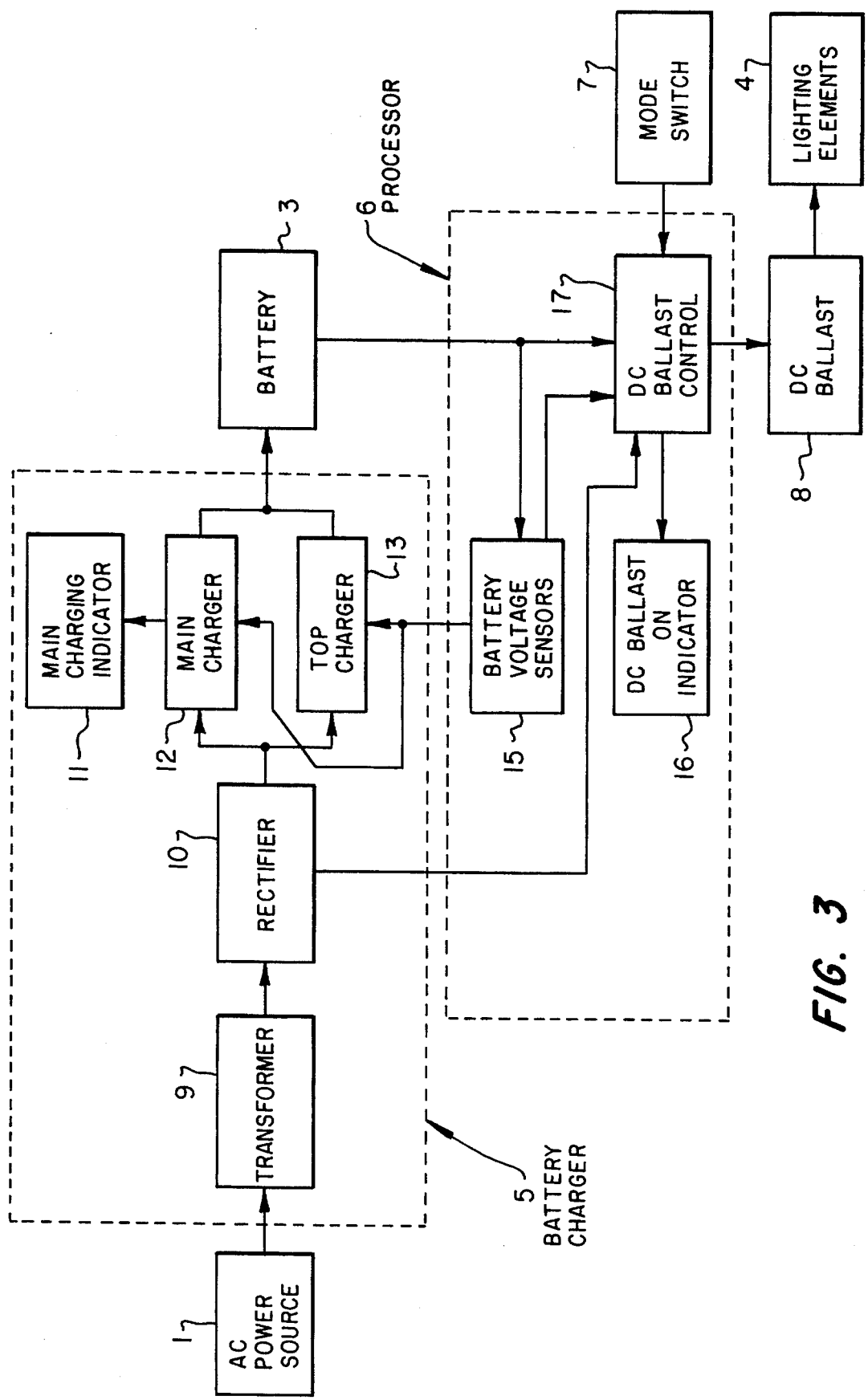
FIG. 3 is an expanded block diagram showing certain of the elements of FIG. 2.

In FIG. 3, the battery charger 5 and the processor 6 of a first embodiment are shown in greater detail. The battery charger 5 shown in the upper dashed rectangle includes a transformer 9 for changing the voltage level of the commercial power source to a level suitable for use in the circuits and in charging the battery 3. A conventional rectifier 10 converts the thus-transformed AC power to unidirectional (pulsed DC) power for charging the battery 3 and for powering various electronic control circuits of the system. Two charging rates are provided. These are termed "main charging" and "top charging". Main charging, performed by the main charger 12, supplements the charging by the top charging so that both occur concurrently, thereby providing a higher current level than top charging alone. Main charging is invoked when the battery voltage has fallen to a minimum critical level. Top charging, performed by the top charger 13 alone, is used to "top off" the battery charge at a reduced current level and is invoked when the battery voltage is above a specified level near its maximum value but less than the maximum predetermined value. The main charger indicator 11, provides a ready visual indication of the rate of charging of the battery, with the brightest light indicating the maximum charging rate.

As mentioned above, one of the features of the invention is the provision of top charging that normally is operative only when the voltage of the battery is equal to or greater than the aforementioned specified level near its maximum value and less than a predetermined greater value referred to as the maximum value in the preceding paragraph. Thus, in contrast with many previously proposed systems, provision is made to turn off or otherwise essentially deactivate the top charging when the voltage level, or charge level, is at or above such maximum value. By such, the battery is kept from becoming overcharged, with the attendant possibility of damage or reduced life.

The processor 6 (shown within the lower dashed rectangle of FIG. 3) is responsive to the selection of the desired mode of operation (i.e., modes A, B or C) to condition the circuits to operate in such selected modes. Processor 6 includes battery voltage sensors 15 for detecting when various critical battery voltage levels have been reached and provides outputs for controlling the main charger 12 and the top charger 13. The processor 6 also detects when the commercial power source 1 has been lost. This information is used, in conjunction with the setting of mode switch 7, for activating the DC ballast control 17 such that the lighting elements 4 are powered in accordance with the operating mode that has been established by the mode switch 7. When the DC ballast 8 has been activated, the DC ballast ON indicator 16 is illuminated.

Figure 4:
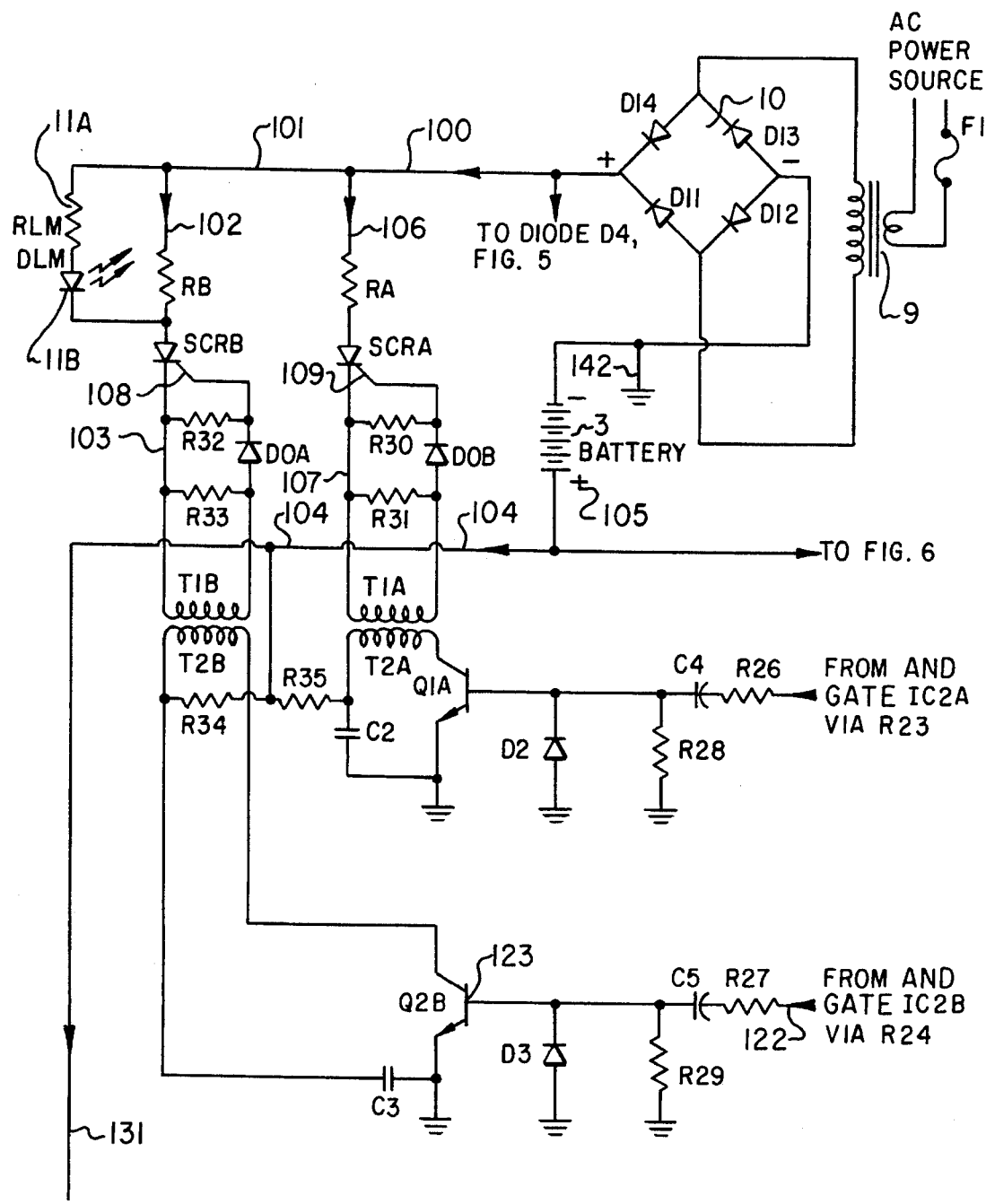
FIG. 4 is a circuit diagram of the battery charger circuits represented by FIG. 3.

FIG. 4 is a circuit diagram of the battery charger 5. The conventional AC power transformer 9 supplies alternating current at suitable voltage and current levels for charging the battery 3. This transformed AC power is converted to pulsed direct current (DC) by the conventional rectifier 10, consisting of diodes D11, D12, D13 and D14.

As mentioned above, there are two different and alternative current paths for charging the battery 3. The main charging path leads from rectifier 10 via conductors 100, 101 and 102 through Resistor RB, silicon controlled rectifier gate SCRB, and conductors 103 and 104 to the positive terminal 105 of battery 3. The top charging path leads from rectifier 10 via conductors 100 and 106 through Resistor RA, silicon controlled rectifier gate SCRA, and conductors 107 and 104 to the positive terminal 105 of battery 3. As will be evident to those skilled in the art, resistors RA and RB establish the maximum charging currents for the main and top charging modes. SCRB and SCRA are silicon controlled rectifiers which act as controlled switches to control main charging or top charging, respectively. These SCR's normally act as open circuits unless an appropriate trigger signal is applied to the gate terminal of a selected one of the SCR's, in which case that selected SCR switches to a current conduction mode. Resistors R30, R31, R32 and R33 maintain the stability of the current flowing through the gate terminals 108 and 109 of SCRB asnd SCRA. Diodes DOA and DOB prevent reverse current from passing through the SCR's. The modes of operation of silicon controlled rectifiers SCRB and SCRA are as follows: SCRB is triggered by a pulse from pulse transformer T1B-T2B which, in turn, is excited by the pulse generator amplifier "main", comprising C3, C5, D3, Q2B, R27, R29 and R34, when a control signal is received from the battery voltage sensor 15 via the path labelled "From AND GATE IC2B via R24." Similarly, SCRA is triggered by a pulse from pulse transformer T1A-T2A which, in turn, is excited by the pulse generator amplifier "top", comprising C2, C4, D2, Q1A, R26, R28 and R35, when an appropriate control signal is received from the battery voltage sensor 15 via the path labelled "From AND GATE IC2A via R23."

Pulse generator amplifier "main" and pulse generator amplifier "top" are seen to be similar and to operate in a similar manner. Thus, the following description of operation for pulse generator amplifier "main" is applicable to pulse generator amplifier "top" with a change, of course, to the corresponding circuit elements.

When a pulse is received from the battery voltage sensor 15 as described above, it is conducted on conductor 122 through resistor R27 and capacitor C5 to the base 123 of transistor Q2B. Diode D3 and resistor R29 are provided to ensure the desired level of bias voltage on the base 123 of transistor Q2B.

Transistor Q2B is seen to be configured in an amplifying mode so that the signal applied to its base 123 is amplified and applied to winding T2B of transformer T1B-T2B. It is thence conducted through transformer T1B-T2B and through diode DOA to the gate terminal of silicon controlled rectifier SCRB where it is effective to "fire", that is, to turn it on and render it conductive so that charging current can flow therethrough. As mentioned above, the circuits associated with pulse generator amplifier "top" operate in a similar manner.

When main charging is in progress, the charging level is indicated by the brightness of the main charging indicator 11 which is observed to be light emitting diode DLM 11B connected in series parallel relationship with current limiting resistor RLM 11A and resistor RB. As will be evident from an inspection of the circuit, essentially all of the charging current passing through SCRB passes through resistor RB, developing a voltage thereacross that is proportional to the value of such current. Such developed voltage also appears across serially connected RLM and DLM, thus activating the light emitting diode DLM 11B and causing it to emit light proportional to the voltage applied thereto which, of course is proportional to the charging current passing through SCRB.

Figure 5:
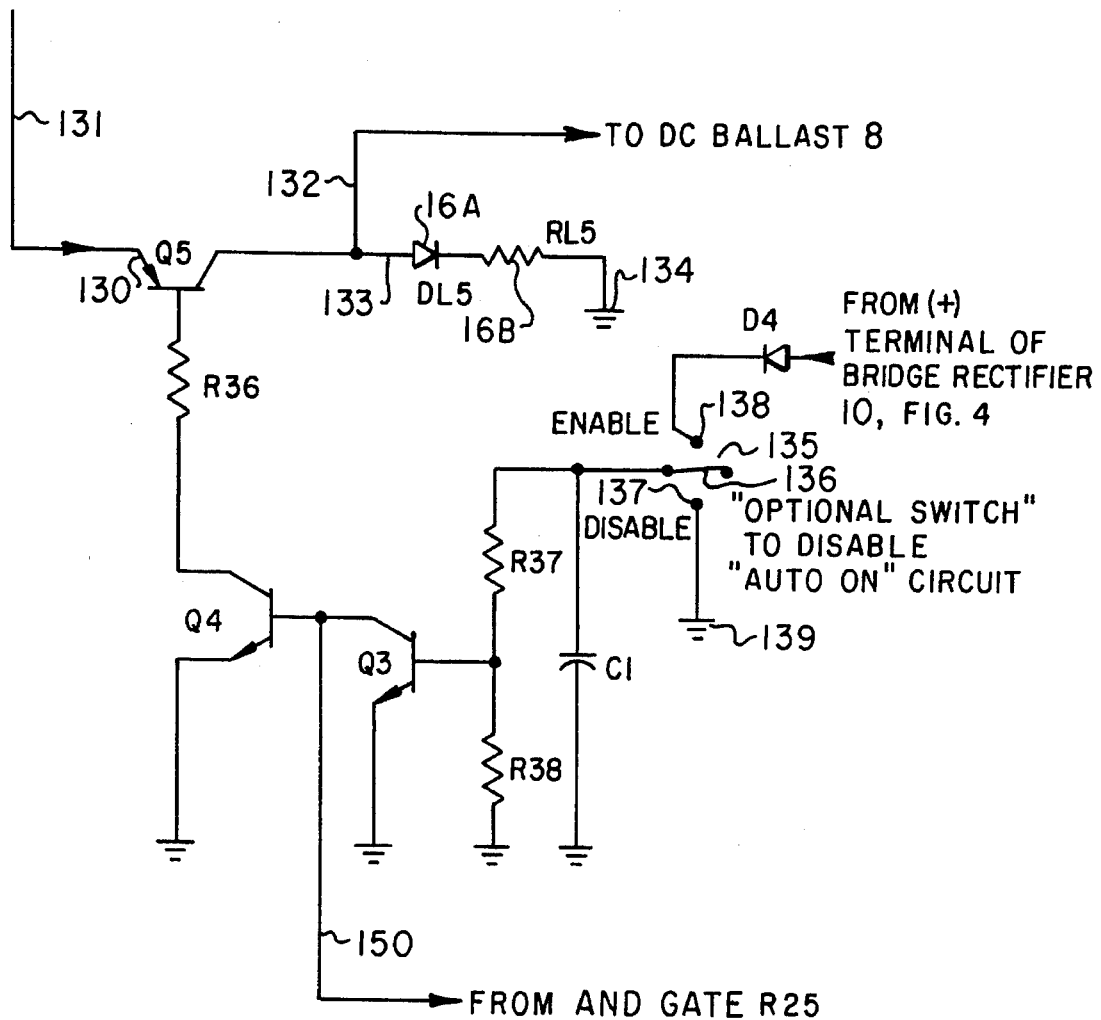
FIG. 5 is a circuit diagram of the DC ballast control, as shown in FIG. 3.
Figure 6:
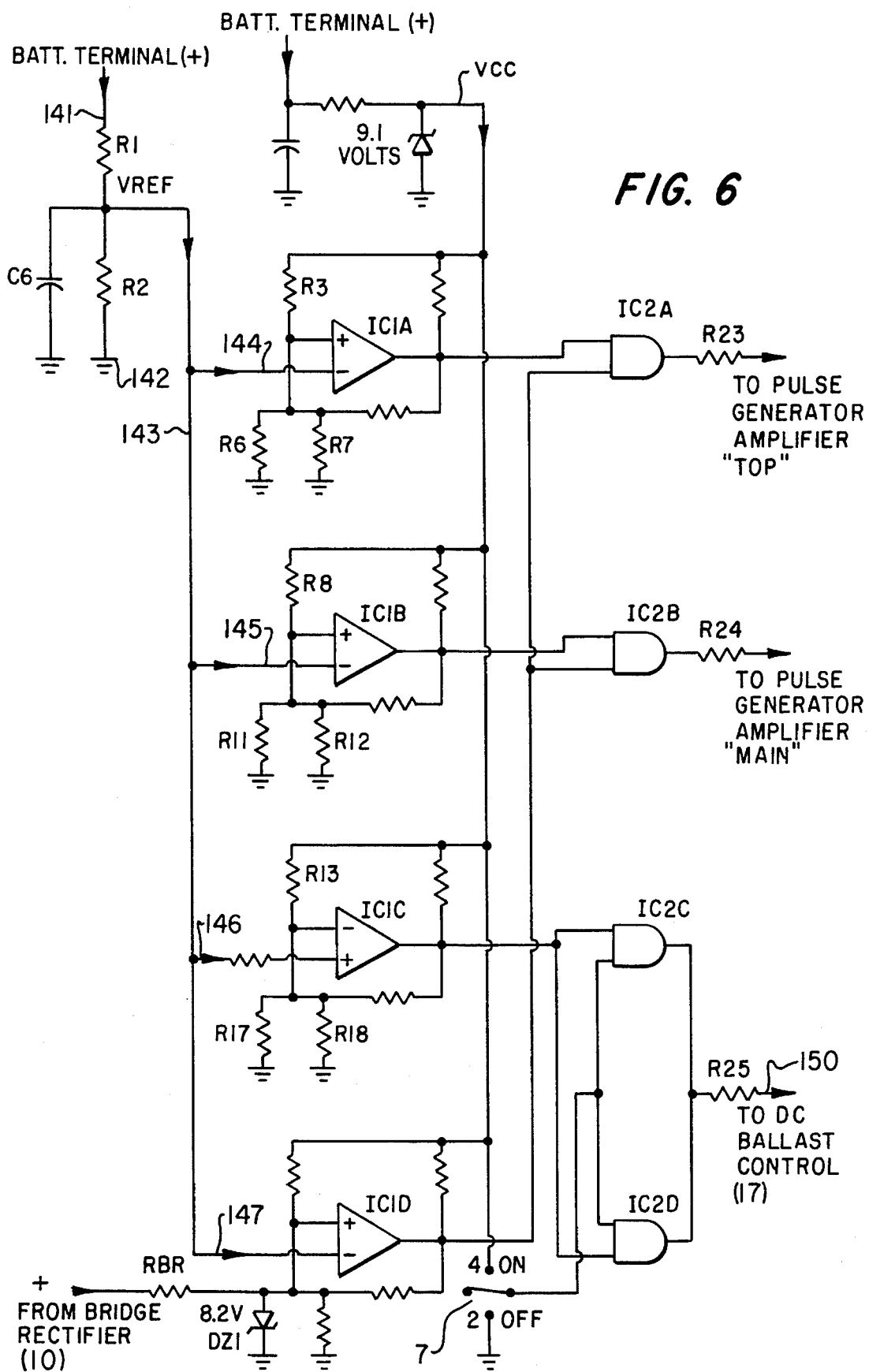
FIG. 6 is a circuit diagram of the voltage sensors as shown in FIG. 3.

To facilitate correlation of the aforementioned modes of operation, i.e., modes A, B and C, with the circuits of FIGS. 5 and 6, the following table may be helpful.

| Mode | Switch 7 | Switch 135 |
| --- | --- | --- |
| A | OFF | DISABLE or ENABLE |
| B | ON | DISABLE |
| C | ON | ENABLE |

FIG. 5 is a circuit diagram of the DC ballast control 17 (FIG. 3). In particular, the control consists of R36, R37, R38, C1, D4, DL5, RL5, Q3, Q4 and Q5. It is used to turn ON and OFF the DC ballast 8, depending on the presence or absence of power from the source and the setting of the mode switch 7 (FIG. 3). When the DC ballast 8 is activated, the DC ballast ON indicator 16, composed of light emitting diode DL5 16A and resistor RL5 16B is illuminated.

Provision is made to disable the aforementioned automatic feature by providing optional enable/disable switch 135 comprising movable contact member 136 and stationary contacts 137 and 138. When it is desired to disable the automatic feature, movable switching contact member 136 is moved to the lower position in which it completes a circuit from ground 139 through member 136 and thence to the upper terminals of resistor R37 and C1, thus deactivating circuits associated with transistor Q3. However, in the enable position, switch 135 is in a position in which switching member 136 is disengaged from terminal 137 and ground 139, and instead is positioned to contact terminal 138 so that a path is completed through diode D4 to the positive terminal of bridge rectifier 10 (FIG. 4).

Further reference reveals the inclusion of transistors Q3 and Q4, together with attendant biasing and control elements C1, R37, R38 and R36. These transistors Q3 and Q4 provide the drive needed to condition power transistor Q5 into its conducting/non-conducting states. These circuits operate in the following manner: When switch 135 is in its enabling position (contact 136 being in electrical communication with contact 138), transistor Q5 is switched to on so that power is conducted therethrough from conductor 131 to conductor 132 and thence to DC ballast 8. On the other hand, when switch 135 is positioned so that contact is grounded through 137 and 136, transistor Q5 is switched off so that power from conductor 131 is interrupted and does not extend via conductor 132 to ballast 8.

FIG. 6 is a circuit diagram of the voltage sensors, voltage sensor comparator/amplifiers and logic circuits. The reference voltage, VREF, is the output of the voltage divider, a series arrangement of two resistors, R1 and R2, connected across the positive and negative terminals of the battery 3.

Thus, conductor 141 is connected to the positive terminal of battery 3, and ground 142 is connected to the negative terminal of battery 3, all as shown on FIG. 4. VREF is essentially determined by the ratio of the serially connected resistors R1 and R2. Capacitor C6 is provided in order to by-pass to ground (and therefore essentially eliminate) any spurious transients or electrical noise and therefore smooth and stabilize the VREF voltage present on conductor 143.

Reference voltage VREF is input from conductor 143 to the comparator circuits, IC1A, IC1B, IC1C, and IC1D via conductors 144, 145, 146 and 147. Comparator circuits IC1A, IC1B, IC1C and IC1D are conventional comparator circuits that are well known in the art and are commercially available from any of a variety of semiconductor manufacturers.

Each comparator circuit has its own fixed voltage reference which is being compared to the reference voltage, VREF. These individual reference voltages are individually determined by the relative values of the resistors that make up the voltage divider networks, e.g., resistors R3, R6 and R7 for IC1A, and corresponding resistors for networks IC1B, IC1C and IC1D.

For IC1A, when the reference voltage VREF is greater than its fixed reference voltage as determined by resistors R3, R6 and R7, it will automatically turn OFF the top battery charger by transmitting a disabling signal through AND gate IC2A, resistor R23, and capacitor C4 (FIG. 4) to transistor Q1A (FIG. 4). Likewise, if the reference voltage is less than the fixed voltage reference of IC1A, it will turn the top battery charger 13 ON by transmitting an enabling signal through AND gate IC2A, resistor R23 and capacitor C4 (FIG. 4) to transistor Q1A (FIG. 4).

IC1B operates in a similar manner. The fixed voltage reference of IC1B is determined by resistors R8, R11 and R12 and is related to the voltage levels at which the main battery charger 12 is to be activated/deactivated. In other words, it performs a function similar to that of IC1A except that it is in relation to the main battery charger 12, turning main battery charger 12 OFF and ON depending on the results of the voltage comparison. In order to accomplish this control, enabling and disabling signals are transmitted from IC2B via resistor R24 and resistor R27 (FIG. 4) and thence through capacitor C5 to the base 123 of transistor Q2B (FIG. 4).

Now returning to FIG. 6, when the reference voltage, VREF, is less than the fixed voltage reference of IC1C, as determined by resistors R13, R17 and R18, IC1C will turn OFF, but will turn back on (be in the ON state) when VREF exceeds the fixed voltage reference. IC1C is connected to IC2C and IC2D. When both the mode switch 7 and the output of IC1C (which are the inputs of IC2C and IC2D) are in the ON (or HIGH, or "1") state, it will trigger a HIGH output from AND gates IC2C and IC2D. This is fed via resistor R25 and conductor 150 to the transistors Q4 and Q5 (FIG. 5), turning them on, and allowing the DC ballast 8 to operate.

If IC1D is HIGH and IC1A is also HIGH, the AND gate, IC2A will be in the HIGH state. If IC1D remains HIGH and IC1B is also HIGH, IC2B will turn ON. The zener diode, DZ1A, together with resistor RBR, establishes a fixed reference voltage for IC1D for biasing and comparison purposes and prevents IC1D from overriding its reference voltages. It also trims the voltage coming from rectifier 10 (via resistor RBR) to 8.2 volts. To trigger IC1D to HIGH, the fixed voltage must be greater than the referenced voltage VREF.

As mentioned above, IC2A is connected to the top pulse generator amplifier while IC2B is connected to the main pulse generator amplifier. Both amplifiers have similar circuit functions which are to control the chargers 12 and 13 respectively.

Low-voltage battery cutoff is established by setting the value of the voltage reference compared to the fixed voltage reference of IC1C, as determined by resistors R13, R17 and R18. Thus, IC1C will be in the LOW (or OFF, or "0") state when the value of the voltage reference becomes less than the value of the fixed voltage reference and the outputs of IC2C and IC2D will also be in the LOW state, even if the manual switch 7 is in the ON state. The switching circuit amplifier Q5 (FIG. 5) will be open (or OFF) so that no power will be delivered therethrough via conductor 132, and accordingly, the DC ballast 8 will be in the OFF state, effectively cutting off the battery power source, i.e., power from battery 3.

Figure 7:
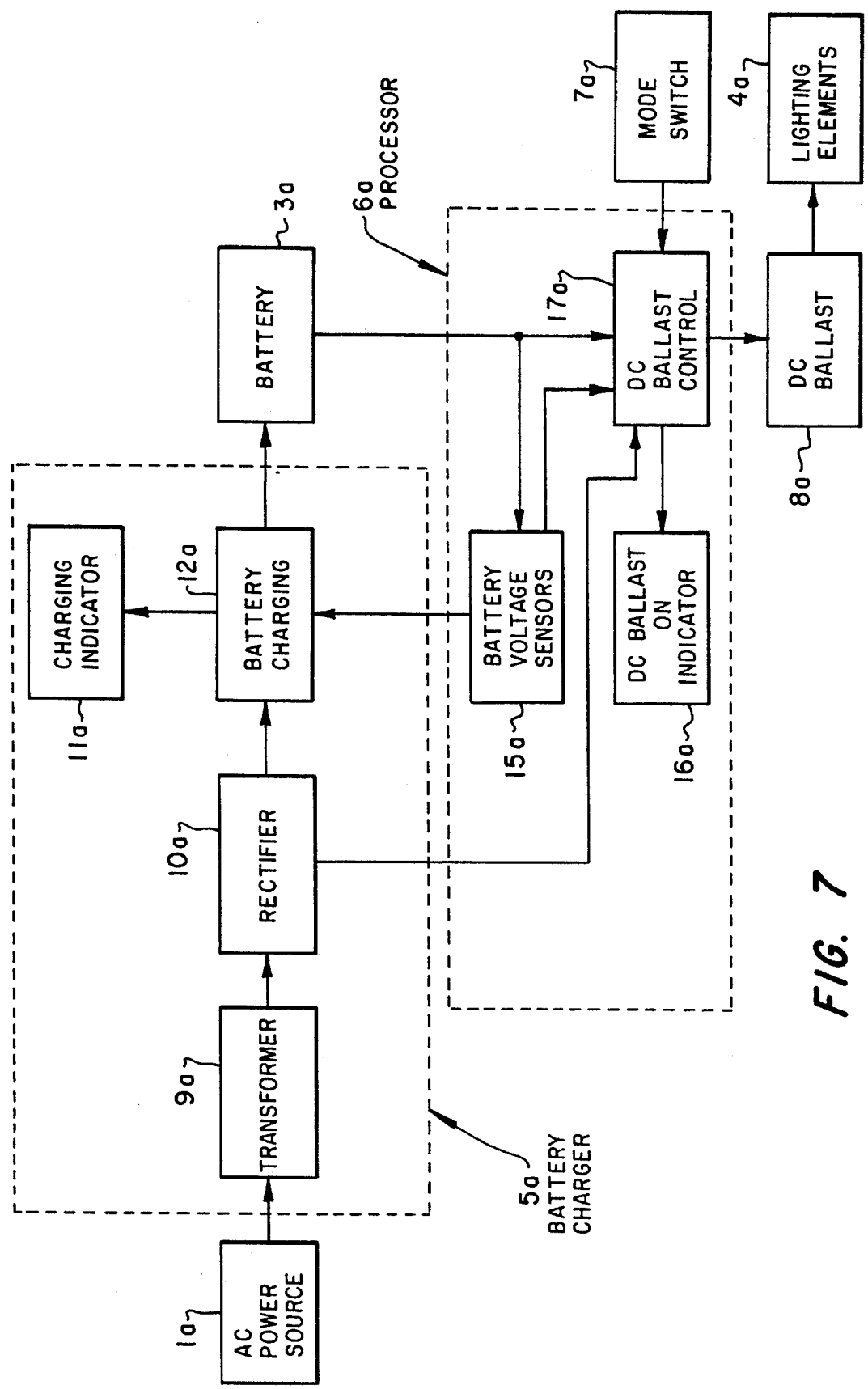
FIG. 7 is a block diagram, similar to FIG. 3, for an alternate simplified embodiment in which separate top charging circuits are eliminated.

Now turning to FIG. 7, it will be observed that it depicts a block diagram generally similar to that of FIG. 3. However, the diagram of FIG. 7 pertains to a second preferred embodiment of the circuits according to the invention wherein, inter alia, battery charging circuits are simplified by omitting the top charger 13 of FIG. 3 and including a "constant voltage" or "exponential" charger 12a in which the charging rate defends upon the amount of charge needed by the battery. When a large amount of charge is needed, the rate is high. When only a little charge is needed, the rate is low. Further reference to FIG. 7 reveals that elements corresponding to similar elements in FIG. 3 are identified with the same numbers together with the suffix "a". Thus, the AC power source in FIG. 7 is identified with the symbol 1a, whereas the corresponding item in FIG. 3 is identified with the symbol 1.

Since except for the main and top charging circuits of FIG. 3 and the corresponding battery charging circuits 12a of FIG. 7, the remaining items operate in a generally similar way, the functional description of the blocks of FIG. 3 are not repeated for FIG. 7, the specific circuit components and the way in which they operate being described hereinafter in detail with respect to FIGS. 8, 9 and 10.

Figure 8:
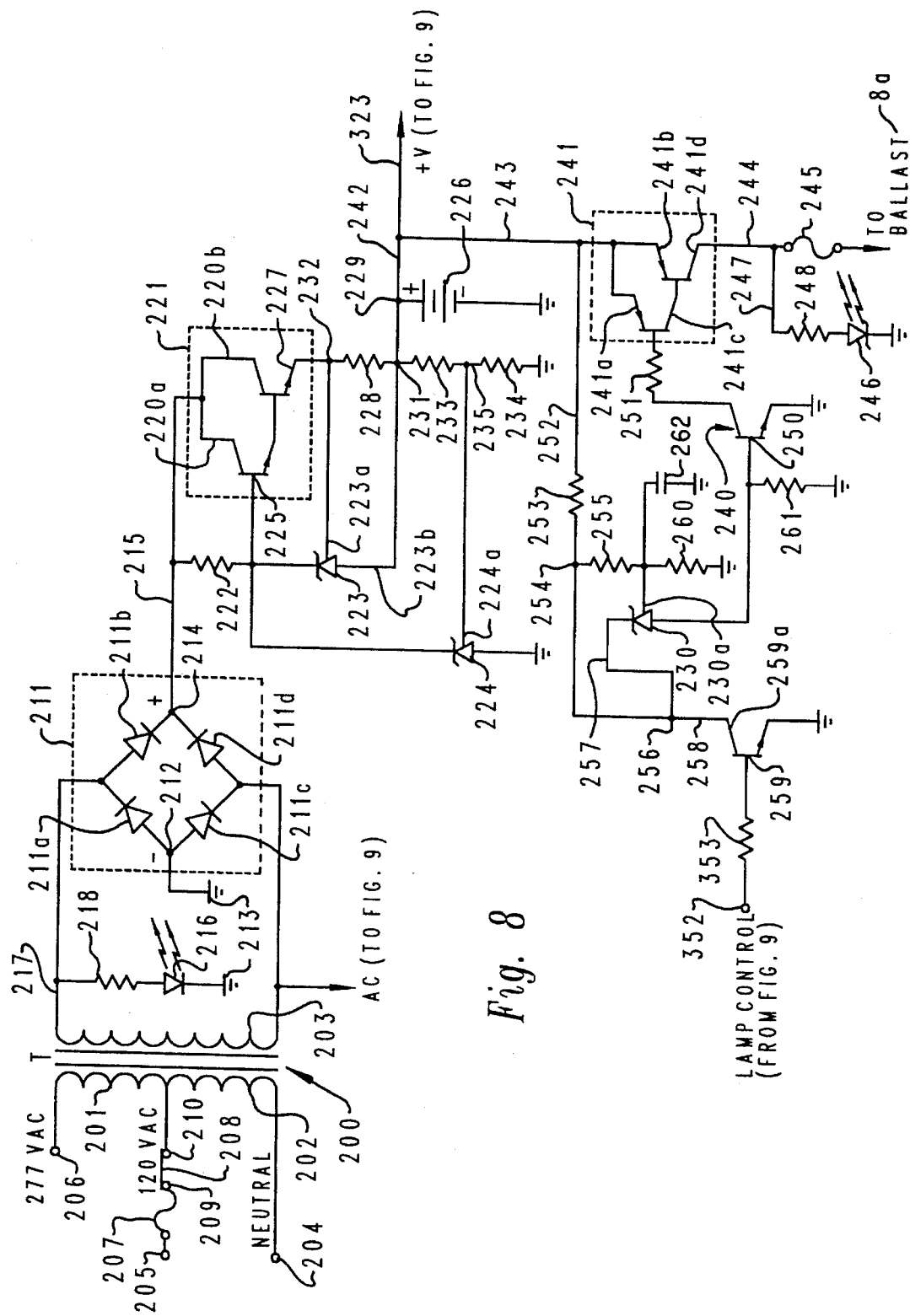
FIG. 8 is a circuit diagram of preferred battery charging and control circuits for the simplified embodiment of FIG. 7.

Now turning to FIG. 8, it will be observed that it depicts the schematic diagram of the battery charging circuits of the alternative embodiment of FIG. 7. Disclosed there is conventional transformer 200 having a two-sectioned primary winding 201/202 and a secondary winding 203. Leads from primary windings 201 and 202 are brought out to terminals 204, 205 and 206 so as to provide for connections to conventional grounded neutral electrical service. Fuse 207 is connected in series with terminal 205 and electrical jumper 208 so as to provide conventional overload protection. As depicted, the circuits are prepared for connection to a 120 volts AC conventional electrical unswitched source of power. However, the circuits are adapted for utilization with a 277 volt AC source by the inclusion of a provision for connecting jumper 208 between terminals 209 and 206 instead of between terminals 209 and 210 as shown.

Secondary winding 203 is connected to the conventional full wave rectifier bridge 211 which comprises rectifiers 211a, 211b, 211c and 211d. The operation of such full wave bridge rectifiers is well known in the art and is similar to that for the bridge comprising D11–D14 of FIG. 4. The bridge in FIG. 8 has the negative terminal 212 connected to ground 213, whereas the positive terminal 214 is connected to postive direct current line 215. Light emitting diode 216 is connected from the upper secondary terminal 217 through current limiting resistor 218 to ground 213, thereby providing for a visual indication of the state of energization of transformer 200.

According to the alternative embodiment of FIGS. 7–10, the transformation ratio of transformer 200 is selected so as to produce at the secondary thereof approximately 20 volts AC. However, it will be evident to those skilled in the art that with different battery voltages and corresponding changes to associated circuit parameters, other voltage levels could be employed.

As will be evident to those skilled in the art, the rectified voltage waveform appearing on pulsating direct current output line 215 is that of positive half cycles of the alternating voltage applied to the input of transformer 200. Moreover, it will be evident that the positive half cycles on direct current output line 215 are at twice the alternating current frequency of the power source.

The pulsating direct current appearing on line 215 is applied to the collector circuits 220a and 220b of power NPN Darlington Transistor 221. Transistor 221 is connected so as to act as a series voltage regulator, with resistor 222 and precision shunt regulator devices 223 and 224 providing the required biasing into base 225 of transistor 221. When the charger is operating, charging current flows through pulsating direct current output line 215 and thence through Darlington Transistor 221, emerging therefrom at emitter 227 whence it is conducted through current limiting resistor 228 and thence to the positive terminal 229 of battery 226.

Precision shunt regulators 223, 224 and 230 act as controlled zener diodes. They conduct in the reverse zener direction only when the voltage as measured from the control input to the anode (223a, 224a and 230a) is greater than 2.5 volts. Otherwise, they are essentially nonconductive. Therefore, they are conditionable to conducting or nonconducting states according to biasing and such conditions that result from the inter-relationships of the applied voltages as will be evident to those skilled in the art.

Controlled zener diode 223 is connected at its anode 223b to the junction between resistor 228 and the positive terminal 229 of battery 226. At its control electrode 223a, control zener diode 223 is connected to connection 232 which joins the upper portion of resistor 228 and emitter 227 of Darlington Transistor 221. Thus, voltage drop across resistor 228 which results from current flowing therethrough is applied between anode 223b and control input 223a, thereby controlling shunt regulator device 223 to a conducting/nonconducting state which changes the bias on the base 225 of Darlington Transistor 221 and controls its conduction therethrough.

It will thus be seen that since the voltage drop across resistor 228 is directly proportional to the current, that when such current rises to a predetermined level, control zener diode 223 is conditioned to conduct in its reverse direction thereby changing the bias on the base 225 of Darlington Transistor 221 and causing it to limit the current therethrough. Accordingly, a predetermined upper limit is imposed on the level of current, thereby to provide a measure of overload control for transformer 200 and rectifier 211.

As will be evident to one skilled in the art, the foregoing control of the current is accomplished by choosing a value for resistor 228 which provides the critical control voltage drop of 2.5 volts for control zener 223 at the desired maximum current. When this value of current is reached, control zener 223 begins to bleed base current away from the base 225 of Darlington Transistor 221, thereby completing a negative current feedback loop which limits the current in emitter 227 and consequently the current in the connected circuits.

In addition to controlling the level of charging current as described above, circuits are also included to control the level of voltage applied to the terminals of battery 226. This is accomplished by a combination of precision shunt regulator 224 and the voltage divider comprising resistors 233 and 234. As will be observed from inspection of FIG. 8, resistors 233 and 234 are connected in series between ground and junction 231 which is connected directly to positive terminal 229 of battery 226. Accordingly, the voltage which appears at junction 235 between resistors 233 and 234 is directly proportional to the battery terminal voltage. The ratio between resistor 233 and 234 is selected so as to produce at junction 235 the aforementioned critical threshold voltage of 2.5 volts when the battery terminal voltage is at a preselected maximum which, according to this preferred embodiment, is about 15 volts. Any further increase in battery terminal voltage results in a corresponding increase in the voltage appearing at junction 235 and at control electrode 224a, thereby causing precision shunt regulator 224 to begin conducting and bleeding current away from base electrode 225 of transistor 221 and consequently reducing the flow of current therethrough. Accordingly, it will be observed that circuits associated with precision shunt regulators 223 and 224 and Darlington Transistor 221 operate to control both the charging current for battery 226 together with the electrical potential thereof.

Further reference to FIG. 8 reveals NPN Transistor 240 and a power PNP Darlington Transistor 241 together with associated biasing and control circuits. As will be observed, energizing paths leading from battery 226 to ballast 8a extend via conductors 242 and 243 to emitters 241a and 241b of transistor 241 and thence through the transistor, emerging at collector 241d and thence extending through conductor 244 and fuse 245 to the ballast. Light emitting diode 246 is connected to conductor 244 via conductor 247 and current limiting resistor 248. Light emitting diode 246 which is energized when energizing potential is present on conductor 244 provides a visual indication of the presence or absence of such energizing power.

Transistor 241 is turned off or on under the control of transistor 240. Thus, when the base-emitter junction of transistor 240 is forward biased by the application of a suitable potential to its base, (i.e., when transistor 240 is "on"), potential on its collector is lowered correspondingly, and such potential is communicated through resistor 251 to the base of transistor 241, thereby forward biasing its emitter base junction and causing current to flow therethrough.

Further reference to FIG. 8 reveals that biasing potentials for the control circuits associated with transistor 241 are provided from conductor 243 via conductor 252 and resistor 253 to the intersection 254 between the upper terminal of resistor 255 and intersection 256 whence paths via conductor 257 lead to precision shunt regulator 230 and via conductor 258 to the collector 259a of transistor 259, thus supplying direct current potentials needed for circuit operation.

As mentioned above, it is NPN Transistor 240 that is instrumental in switching power PNP Darlington Transistor 241 to a conducting or non-conducting state whereby ballast energizing voltage and current are conducted via line 244 and fuse 245 to the ballast 8a of the lighting fixture. Precision shunt regulator 230 and lamp control transistor 259 are effective to condition NPN Transistor 240 to its activating or deactivating condition.

When transistor 259 is in its deactivated or non-conducting state, the voltage applied to the control input 230a of shunt regulator 230 is determined by the ratio of resistor 260 to the total series resistance represented by the sum of resistor 253, 255 and 260. The values of these resistors are selected so that as long as the terminal voltage of battery 226 is above a 10.5 volt lower limit, sufficient current flows through shunt regulator 230 and through resistor 261 so as to raise the voltage existing at base 250 of transistor 240 to a conducting state, thereby turning on transistor 240 and power PNP Darlington Transistor 241. However, if the terminal voltage of battery 226 should drop below the predetermined threshold value of 10.5 volts, then less than 2.5 volts will exist at control input 230a. Consequently, precision shunt regulator 230 will not conduct, and transistors 240 and 241 will be turned off, thereby interrupting any flow of current that may have passed from battery 226 to the ballast 8a. Thus, it will be observed that the circuits provide for interruption of current flow to ballast 8a when the terminal voltage of battery 226 has dropped below a predetermined value.

In the circuits associated with precision shunt regulator 230, it is important that the voltage appearing on the control electrode 230a be smooth and devoid of excessive ripple. Accordingly, capacitor 262 is provided to bypass to ground undesired ripple components that otherwise would exist at control electrode 230a, thereby providing for effective operation of precision shunt regulator 230 in the manner described above.

From the foregoing description, it will be evident that when lamp control transistor 259 is turned off, and when the battery voltage is equal to or exceeds the predetermined threshold level (as an example, 10.5 volts), activating current will be extended to ballast 8a, thereby energizing the same and providing for continuous lighting. However, when lamp control transistor 259 is switched on by the circuits hereinafter described with respect to FIG. 9, substantial additional current is conducted through conductor 258 thereby substantially increasing the voltage drop across resistor 253 and consequently decreasing the voltage at intersections 254 and 256. When this occurs, the voltage present across resistor 260 is reduced below the aforementioned activating threshold level of 2.5 volts for precision shunt regulator 230, thereby rendering it non-conductive and turning off transistors 240 and 241, thereby interrupting the flow of current from battery 226 to ballast 8a and turning off the connected light. It will thus be seen that either of two occurrences will interrupt the normal flow of current to ballast 8a: (1) the reduction of battery terminal voltage below the aforementioned threshold value; or (2) turning on of lamp control transistor 259.

Figure 9:
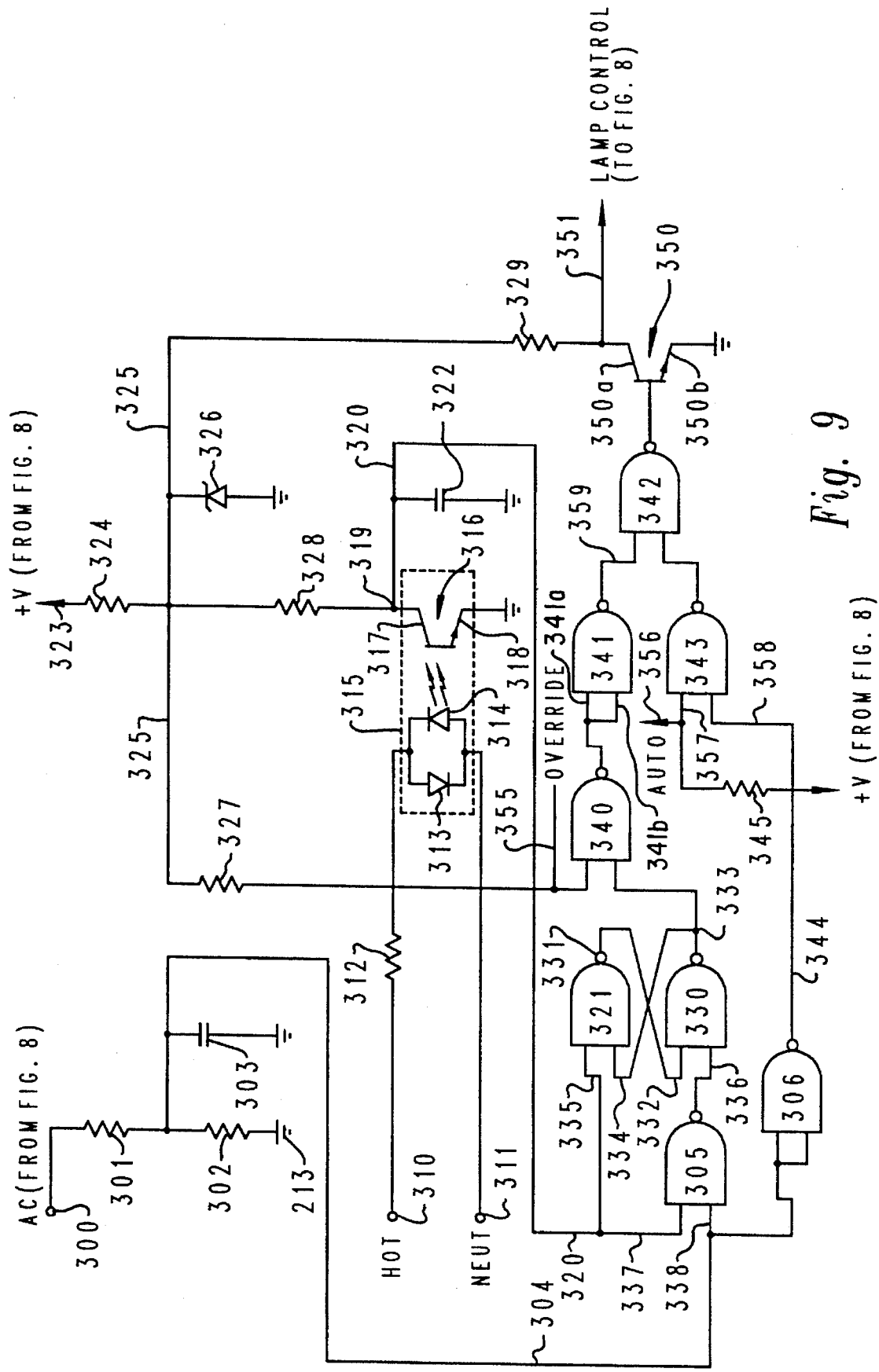
FIG. 9 is a circuit diagram of the logic circuits for the ballast control circuits.

Now turning to FIG. 9, it will be observed that in the upper left hand corner thereof there is shown terminal 300 which is identified as "AC (from FIG. 8)" and which represents the connection having a corresponding reference in FIG. 8. Accordingly, it will be observed that there is applied between terminal 300 and ground 213 a pulsating and direct current voltage, dc because of the diodes of diode bridge 211 that are interposed in the circuits leading from the secondary winding 203 of transformer 200 to ground 213 (FIG. 8). Resistors 301 and 302 are connected in series as shown between terminal 300 and ground 213, and capacitor 303 is provided to smooth such direct current rectified voltage and render it suitable for application to the inputs of NAND Gates 305 and 306. The values of resistors 301 and 302 are selected so that a relatively high voltage signal corresponding to a logical 1 is presented to the Nand Gates 305 and 306 whenever AC power is being supplied by the unswitched power source as communicated through transformer 200 which, as mentioned above, is connected to an unswitched (continuously on) AC circuit. Accordingly, a way is provided for the logic circuits to sense when there is a general power failure loss of voltage as well as to sense when the lights in question respond from a switched supply source.

In order to provide for utilization with lights which have been switched on or off as for example by a wall switch, another control logic signal is optionally developed by sensing the switched alternating current circuit. This is provided by the circuits in FIG. 9 which originate with "HOT" 310 and "NEUT" 311. As will be evident to those skilled in the art, terminal 311 is connected into the neutral circuit as for example terminal 204 of FIG. 8, and the "HOT" terminal 310 is connected to the circuits downstream from the lamp control switch; that is, that are separated and controlled by the wall switch or other lamp control switch from a main source of alternating current electrical supply. Thus, alternating current electrical potential exists between terminal 310 and 311 when a control (e.g. wall) switch to normally activate the lights is closed and is absent when the light activation switch is open.

When the light activation switch is closed and alternating current electrical potential exists between terminals 310 and 311, a virtual circuit is extended through resistor 312 and the light emitting diodes 313 and 314 of optocoupler 315. Accordingly, the transistor-like portion 316 of optocoupler 315 is activated so that current readily flows therethrough, thereby decreasing the voltage existing at collector 317 to a value approaching that of emitter 318, namely ground potential. Such ground potential which also therefore exists at junction 319 is communicated via conductor 320 to the upper logical inputs of NAND Gates 305 and 321. Capacitor 322 is provided to smooth any ripples in the output signal from upper coupler 315.

At the top center of FIG. 9, there is a connection 323 which connects to a corresponding location at the right hand side of FIG. 8. Thus, battery potential is conducted from battery 226 via terminal 229 and conductor 242 and thence to location 323 on FIG. 9 and through resistor 324 to direct current bus 325. The potential on bus 325 is maintained at the desired level of about 5 volts DC by the zener diode 326. As will be observed from further inspection of FIG. 9, activating voltages for the logic circuits, optocoupler 315 and the lamp control transistor 350 are extended from DC bus 325 through resistors 327, 328 and 329, respectively.

As will be recognized by those skilled in the art, a NAND circuit is so constructed that its output is low only when all its inputs are high. If one or more of the inputs is not high, then the output from the NAND circuit is high. Now with this in mind, reference is again made to the logic circuits of FIG. 9.

NAND Gates 321 and 330 are cross connected. Thus, for example, output 331 of NAND Gate 321 is connected to input 332 of NAND Gate 330; and output 333 of NAND Gate 330 is connected to input 334 of NAND Gate 321, thus forming a binary latch, or memory, the combination of NAND Gates 321 and 330 having two stable states: One which hereafter is identified as the SET state and which is characterized by having a 0 output (low voltage) from NAND Gate 330 which causes the output of NAND Gate 321 to be a logical one (high voltage). Conversely, the other latched state, the RESET state, is characterized by having a 0 output (low voltage) from NAND Gate 321 which causes the output of NAND Gate 330 to be one (high voltage).

Further reference to the circuits reveals that the hereinabove described latch (comprising cross connected NAND Gates 321 and 330) has two additional inputs, namely inputs 335 and 336. These are used to control the state transitions.

In order for the latch to be properly controlled, only one of such latch inputs 335 or 336 can be active at any one time. This condition is assured by the logical connection of the input circuits including NAND Gate 305.

Each of the two inputs (i.e., two inputs 335 or 336) directs the latch of NAND Gates 321/330 to one or the other of its two possible states. This direction occurs from an input only when that input is a zero (low voltage). If a latch input on 335 or 336 is a 1 (high voltage) no latch action results from that input: that is, the state of the latch 321/330 remains unchanged. However, if the latch input to NAND Gate 321 (i.e., through input 335) becomes a zero (low voltage), the output of NAND Gate 321 becomes a 1 (high voltage) and remains at that value even if the input to NAND Gate 321 subsequently becomes a one (high voltage), until such time as the state of the latch is changed by causing the other latch input (i.e., terminal 336 of NAND Gate 330) to assume a zero (low voltage) value. As previously mentioned, the state of the latch directed by the input to terminal 335 which causes the output of NAND Gate 321 to be a one (high voltage), is the SET state. The state of the latch 321/330 effected by the input to terminal 336 of NAND Gate 330 which causes the output of NAND Gate 330 to be a one (high voltage) is the RESET state.

Now returning to a consideration of optocoupler 315, it will be recalled that the logic signal therefrom is a 0 (low voltage) when the switched AC circuit (via terminals 310 and 311) is activated. Since this same signal is also the control input for causing the hereinabove described latch 321/330 to SET, it will be recognized that latch 321/330 will be SET whenever the switched circuit is activated. When the switched circuit is not activated, the output of optocoupler 315 is a 1 (high voltage). If the unswitched AC signal at input 338 of NAND Gate 305 is also a 1 (high voltage), the output of NAND Gate 305 will be 0 (low voltage). Thus, as long as the unswitched AC circuit is active as represented by potential conducted via conductor 304 to terminal 338 of NAND Gate 305, the latch 321/330 will follow the state of the switched AC circuit as represented by potentials at terminals 310 and 311. In other words, when the switched AC circuit is on, the latch 321/330 will be set. If the unswitched AC circuit is on and the switched AC circuit is off, the latch 321/330 will be RESET.

When power is lost in the unswitched AC circuit and the voltage which was conducted over conductor 304 to the terminal 338 of NAND Gate 305 is lost, the latch 321/330 will remain in the same state until power is resumed. This latching, or memorizing of the switched AC state is required because when power is lost on the unswitched AC circuit it is also normally lost on the switched AC circuit. Without the latching system as described above, the system would not know whether the lights of the powered devices as described above should be off or on. Because the latch 321/330 remains in the same state, and because the state of the latch is used to control the lights, the lights will normally remain as they were, either off or on, in the event of an AC power failure.

When the aforementioned latch 321/330 is set and if the override terminal (FIG. 9) is not grounded, the output of NAND Gate 330 is 0 (low voltage). This causes the output of NAND Gate 340 to be 1 (high voltage). The output of NAND Gate 341 (which has two inputs 341a and 341b connected together so as to act as an inverter), therefore becomes 0 (low voltage) when the output of NAND Gate 340 is a 1 (high voltage), and the output of NAND Gate 342 becomes 1 (high voltage), thereby turning on NPN switching transistor 350 if the output of NAND Gate 343 is a 1 (high voltage). Transistor 350 has its collector 350a supplied via resistor 329 and conductor 325 from the five volts DC which exists on conductor 325 by virtue of the aforementioned description of the operation of zener diode 326. When transistor 350 is on, the output of its collector 350a is zero (low voltage) and such low voltage potential is conducted therefrom via conductor 351 through input terminal 352 (FIG. 8) and series resistor 353 to input transistor 259, thus turning off transistor 259 so that power PNP Darlington Transistor 241 will be on and the above described circuits leading to ballast (lights) will be activated.

Activation of the ballast (lights) can be turned off by grounding (i.e., by connecting to a logic zero) the override conductor 355 (FIG. 9). Thus, override 355 serves as an optional logic override for the normal switching of switch and unswitched AC power and can be activated by switch or relay contacts or by interfacing with standard compatible logic signal levels (not shown). In this connection, it is noted that while not necessary, in accordance with the alternative preferred embodiment hereof, transistor logic (TTL logic) is deemed particularly suitable for employment. By the use of such preferred logic and by the use of override 365, provision is made for remote (wired or wireless) override switching which can be from a manually activated switch (wired or wireless), from an automatic occupancy sensor, computerized building security system, or other control.

If the aforementioned override 355 is not grounded (i.e., not in override mode), the state of the ballast (lamp) will depend on the signals in the logic paths comprising NAND Gates 306, 330, 340, 341, 343 and 342. If the unswitched signal which is communicated to the input of NAND Gate 306 via conductor 304 becomes a 0 (low voltage) signifying that AC power has been lost in the unswitched source, since NAND Gate 306 has both its inputs connected together and thus acts as an inverter, the output of NAND Gate 306 rises to a state of 1 (high voltage). If the auto input 356 leading to input 357 of NAND Gate 343 is not grounded as would normally be the case, the voltage at input 357 and 358 to NAND Gate 343 will both be 1's (high voltage), thus causing the output of NAND Gate 343 to be 0 (low voltage). In such event, the output of NAND Gate 342 will be effective to turn on transistor 350, and thus the lamp control circuits described above will be effective to apply activating direct current to the ballast (lamp). Accordingly, the ballast (lamp) will be activated even if it had been off when the AC power failure occured, because the 0 (low voltage) input to NAND Gate 342 forces its output to be 1 (high voltage) regardless of the value of the input that is applied thereto from the output of NAND Gate 341 via conductor 359.

Provision is also made for disabling the aforementioned automatic turnon feature in the event AC power is lost if such feature is not desired. In order to accomplish this, the aforementioned auto terminal 359 can be grounded so as to accomplish such disabling.

Figure 10:
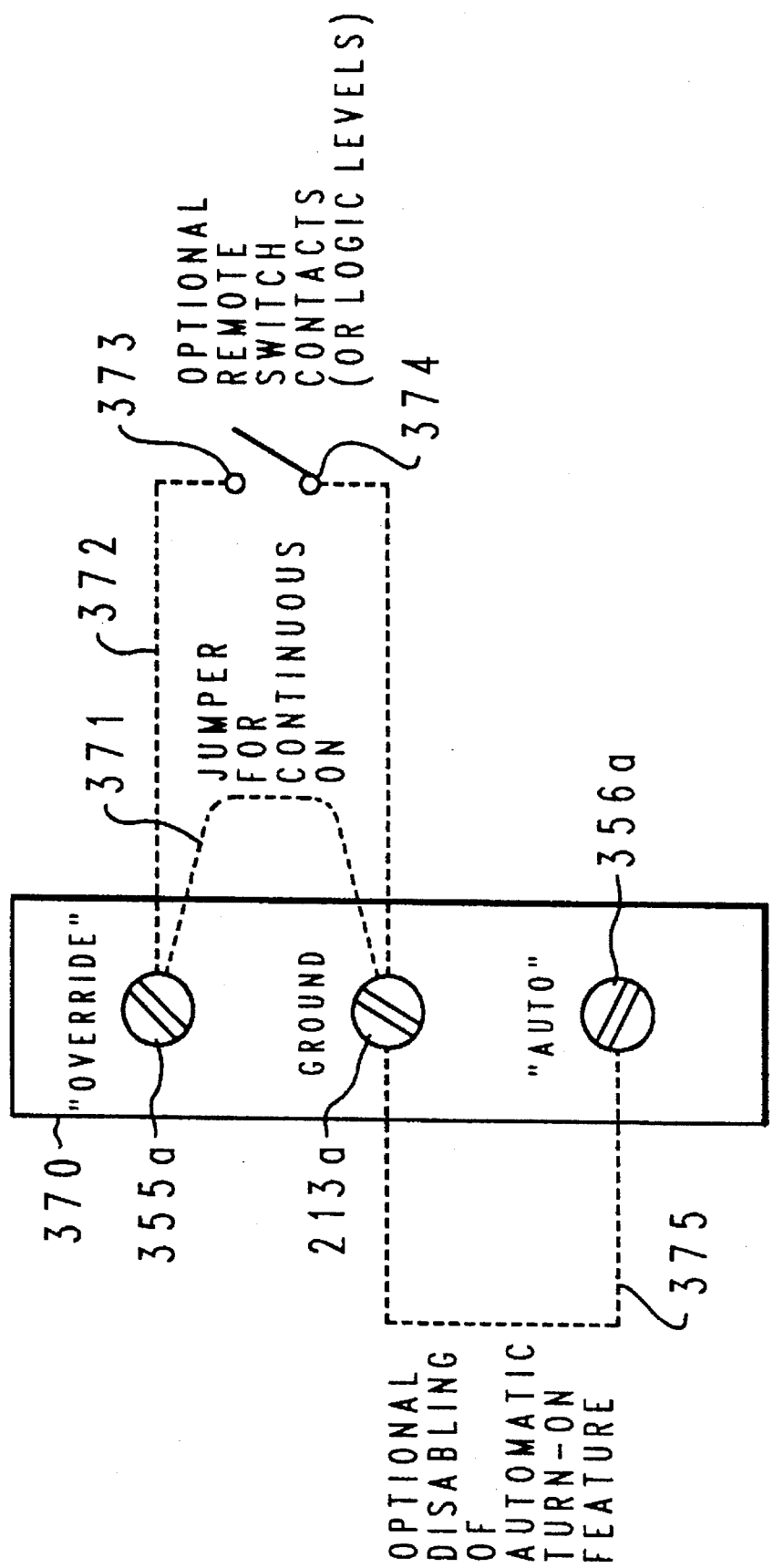
FIG. 10 is a drawing showing terminals and optional provisions for continuous "on" and for disabling of the automatic turn on feature.

Now turning to FIG. 10, it will be observed that it depicts the aforementioned terminals and optional jumpers for the above-described connections to the override and auto inputs 355 and 356. Although any of a variety of circuits, connection blocks and the like may be employed, there is depicted in FIG. 10 a simple terminal block on which there have been mounted terminal 355a (corresponding to override terminal 355 of FIG. 9), ground terminal 213a corresponding to grounds 213 of FIG. 8, and auto terminal 356a which corresponds to auto terminal 356 of FIG. 9. A continuous optional jumper 371 is provided for grounding of override 355 as by connection to terminal 355a; a switchable override jumper is provided as by optional jumper 372 shown connected in series to a switch comprising contacts 373 and 374; and jumper 375 is optionally shown as for disabling the automatic turnon feature described in connection with auto terminal 356 of FIG. 9.

Although the invention hereof has been described by way of example of preferred embodiments, it will be evident that other adaptations and modifications may be employed without departing from the spirit and scope thereof. For example, other types of charger current controls could be employed. The transformer/rectifier combination could be replaced with a switching-mode power supply. In such event, the charger output may be a continuous DC current instead of a pulsating current. Another adaptation of the invention would be to eliminate the DC inverters and supply DC directly to lighting fixtures or bulbs that are adapted for direct DC supply. Yet another is to employ other types of DC inverters, instead of DC ballasts designed for lighting applications, for driving other types of electrical or electronic equipment, such as would be required for emergency communications. Additionally, the local manual mode switches 7 and 7a could be replaced by a remote wireless switch.

The terms and expressions employed herein have been used as terms of description and not of limitation; and thus, there is no intent of excluding equivalents, but on the contrary it is intended to cover any and all equivalents that may be employed without departing from the spirit and scope of the invention.

What is claimed is:

1. A lighting system for use with a source of alternating current power and providing fail-safe uninterruptible light comprising:

(a) A flourescent lighting element;

(b) A battery; and (c) Control means, including control circuits for controlling said lighting element, effective:
      (i) when in a first mode for interconnecting said lighting element concurrently with said battery and with said source of alternating current power to normally energize said lighting element from both said battery and said source of alternating current power and for providing continuing uninterrupted and unswitched power to said lighting element from said battery when said source of alternating current power is interrupted;
      (ii) when in a second mode for sensing the power-on/power-off condition of voltage applied to said lighting element and, when voltage is applied to said lighting element to concurrently supply said lighting element from both said battery and said source of alternating current power when said alternating current power is uninterrupted, said control means being normally and selectively effective when in said second mode, when a voltage is not applied to said lighting element and when said alternating current power is interrupted, to energize and turn on said lighting element from said battery;

said control circuits including circuits for sensing the mode of said control means and when said control circuits are in a first selectable condition and said control means is in said first mode for ensuring energization of said lighting element, said circuits being effective when in a second selectable condition, when said control means is in said second mode, when said voltage is not applied to said lighting element and when said alternating current power is interrupted, to prevent energization of said lighting element from said battery.

2. A fail-safe uninterruptible lighting system for use with a source of alternating current power and providing fail-safe uninterruptible light comprising:

(a) A plurality of alternating current fluorescent lighting elements and ballasts for said lighting elements;

(b) A battery; and (c) Control means, including control circuits for controlling the lighting elements, effective:
      (i) when in a first mode for interconnecting said plurality of lighting elements concurrently with said battery and with said source of alternating current power to normally energize said lighting elements from both said battery and said source of alternating current power and for providing continuing uninterrupted and unswitched power to said plurality of lighting elements from said battery when said source of alternating current power is interrupted;
      (ii) when in a second mode for sensing the power-on/power-off condition of voltage applied to said lighting elements and, when voltage is applied to said lighting elements to concurrently supply said lighting elements from both said battery and said source of alternating current power when said alternating current power is uninterrupted, said control means being normally and selectively effective when in said second mode, when a voltage is not applied to said lighting elements and when said alternating current power is interrupted, to energize and turn on said lighting elements from said battery;

said control circuits including circuits for sensing the mode of said control means, and when said control circuits are in a first selectable condition and said control means is in said first mode for ensuring energization of said lighting elements, said control circuits being effective when in a second selectable condition, when said control means is in said second mode, when said voltage is not applied to said lighting elements and when said alternating current power is interrupted, to prevent energization of said lighting elements from said battery.

3. A lighting system for use with a source of commercial power and providing fail-safe uninterruptible light comprising:

(a) a lighting element and ballast for said lighting element;

(b) a battery;

(c) a switch having a first position and a second position;

(d) a control means including said switch, effective when said switch is in said first position for interconnecting said lighting element concurrently to both said source of commercial power and said battery to normally energize said lighting element from both said battery and said source of commercial power and for providing continuing uninterrupted and unswitched power to said lighting element from said battery when said source of commercial power is disabled; said control means being effective when said switch is in said second position for disconnecting said lighting element from said source of commercial power and said battery thereby to de-energize said lighting element and, when said source of commercial power is disabled, to automatically and fully energize said lighting element from said battery; and (e) override circuits effective when in a first mode for overriding said control means and for energizing said lighting element irrespective of the condition of said switch and said source of commercial power.

4. A fail-safe uninterruptible lighting system for use with a source of alternating current power and providing fail-safe uninterruptible light comprising:
  (a) A fluorescent lighting element;
  A battery;
  (c) Control means, including a latch circuit for controlling said lighting element, normally effective;
    (i) when in a first mode for interconnecting said lighting element concurrently with said battery and with said source of alternating current power to normally energize said lighting element from both said battery and said source of alternating current power for providing continuing uninterrupted and unswitched power to said lighting element from said battery when said source of alternating current power is interrupted;
    (ii) when in a second mode for sensing the power-on/power-off condition of voltage applied to said lighting element and, when voltage is applied to said lighting element to concurrently supply said lighting element from both said battery and said alternating current power when said alternating current power is uninterrupted, said control means being further effective when in said second mode, when a voltage is not applied to said lighting element and when said alternating current power is interrupted, to energize and turn on said lighting element from said battery; and
  (d) override circuits effective when in an override mode for overriding said control means and for energizing said lighting element irrespective of the condition of said control means and said source of alternating current power.

5. A fail-safe uninterruptible lighting system for use with a source of alternating current power and proving fail-safe uninterruptible light comprising:
  (a) A plurality of alternating current fluorescent lighting elements and ballasts for said lighting elements;
  (b) A batter;
  (c) Control means, including a latch circuit for controlling the lighting elements, normally effective;
    (i) when in a first mode for interconnecting said plurality of lighting elements concurrently with said battery and with said source of alternating current power to normally energize said lighting elements from both said battery and said source of alternating current power, and for providing continuing uninterrupted and unswitched power to said plurality of lighting elements from said battery when said source of alternating current power is interrupted;
    (ii) when in a second mode for sensing the power-on/power-off condition of voltage applied to said elements and, when voltage is applied to said lighting elements to concurrently supply said lighting elements from both said battery and said alternating current power when said alternating current power is uninterrupted, said control means being further effective when in said second mode, when a voltage is not applied to said lighting elements and when said alternating current power is interrupted, to energize and turn on said lighting elements from said battery; and
  (d) override circuits effective when in an override mode for overriding said control means and for energizing said lighting elements irrespective of the condition of said control means and said source of alternating current power.

* * * * *